US009917769B2

United States Patent
Anand

(10) Patent No.: US 9,917,769 B2
(45) Date of Patent: Mar. 13, 2018

(54) METHOD AND SYSTEM FOR VIRTUALIZING FLOW TABLES IN A SOFTWARE-DEFINED NETWORKING (SDN) SYSTEM

(71) Applicant: Telefonaktiebolaget L M Ericsson (publ), Stockholm (SE)

(72) Inventor: Prashant Anand, Bangalore (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 236 days.

(21) Appl. No.: 14/542,805

(22) Filed: Nov. 17, 2014

(65) Prior Publication Data

US 2016/0142301 A1 May 19, 2016

(51) Int. Cl.
*H04L 12/931* (2013.01)
*H04L 12/741* (2013.01)
*H04L 12/721* (2013.01)
*H04L 12/717* (2013.01)

(52) U.S. Cl.
CPC .............. *H04L 45/54* (2013.01); *H04L 45/38* (2013.01); *H04L 45/42* (2013.01); *H04L 49/70* (2013.01)

(58) Field of Classification Search
CPC ................................ H04L 45/38; H04L 45/54
See application file for complete search history.

(56) References Cited

U.S. PATENT DOCUMENTS

2013/0176850 A1* 7/2013 Mishra .................... H04L 49/00
370/235

2014/0146674 A1* 5/2014 Wang ...................... H04L 45/38
370/235

OTHER PUBLICATIONS

Bozako (Towards a Scalable Software-Defined Network Virtualization Platform; 2014 IEEE Network Operations and Management Symposium (NOMS), IEEE, May 5, 2014 (May 5, 2014), pp. 1-8).*
Openflow1.4 (OpenFlow Switch Specification Version 1.4.0 (Wire Protocol 0x05) Oct. 14, 2013).*
Yu (M. et al: "NOSIX: A Lightweight Portability Layer for the SDN OS", Computer Communication Review, ACM, New York, NY, US, vol. 44, No. 2, Apr. 8, 2014 (Apr. 8, 2014), pp. 28-35).*
Zdravko Bozakov et al., "Towards a Scalable Software-Defined Network Virtualization Platform", 2014 IEEE Network Operatoins and Management Symposium (NOMS), IEEE, May 5, 2014, pp. 1-8.

(Continued)

*Primary Examiner* — Michael Thier
*Assistant Examiner* — Zhensheng Zhang
(74) *Attorney, Agent, or Firm* — Nicholson De Vos Webster & Elliott LLP

(57) ABSTRACT

In one embodiment, a method is implemented in a network element coupled to the SDN system, which contains a set of network elements processing traffic flows and a SDN controller managing the set of network elements. The method includes creating a set of virtual tables for processing packets of traffic flows at the network element based on a set of flow tables of the network element, where the set of flow tables is ordered in a sequence. The method further includes mapping each of the set of virtual tables to a single flow table of the set of flow tables, where the mapping causes at least one flow table being mapped to a plurality of the set of virtual tables. The method also includes forwarding packets of traffic flows to the set of virtual tables for processing.

20 Claims, 5 Drawing Sheets

(56) References Cited

OTHER PUBLICATIONS

Andreas Wundsam et al., "NOSIX: A Portable Switch Interface for the Network Operating System", TR-12-013, Oct. 1, 2012, 7 pages.
Minlan Yu et al., "NOSIX: A Lightweight Portability Layer for the SDN OS", Computer Communication Review, ACM, vol. 44, No. 2, Apr. 8, 2014, pp. 29-35.
"OpenFlow Switch Specification," Open Networking Foundation, Version 1.3.1 (Wire Protocol 0x04), Sep. 6, 2012, 128 pages.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
B. Fenner, et al., "Management Information Base for the User Datagram Protocol (UDP)," Jun. 2005, 19 pages, Network Working Group, Request for Comments: 4113, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private Lan Service (VPLS) Using BGP for Auto-Discovery and Signaling," Jan. 2007, 28 pages, Network Working Group, Request for Comments: 4761, The IETF Trust.
M. Lasserre, et al., "Virtual Private Lan Service (VPLS) Using Label Distribution Protocol (LDP) Signaling," Jan. 2007, 31 pages, Network Working Group, Request for Comments: 4762, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF).
Request for Comments: 5865, IETF Trust and the persons identified as the document authors.

* cited by examiner

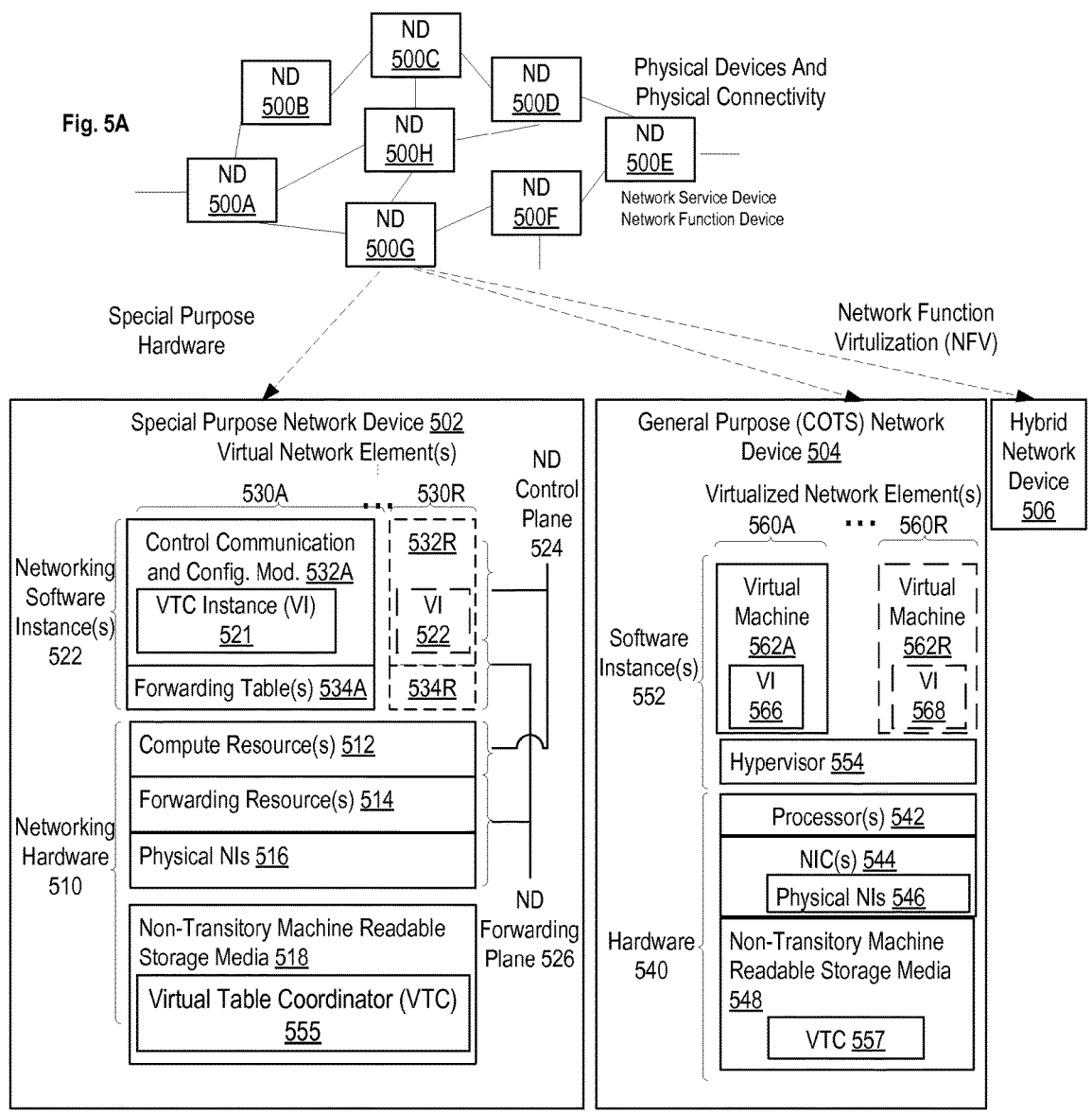

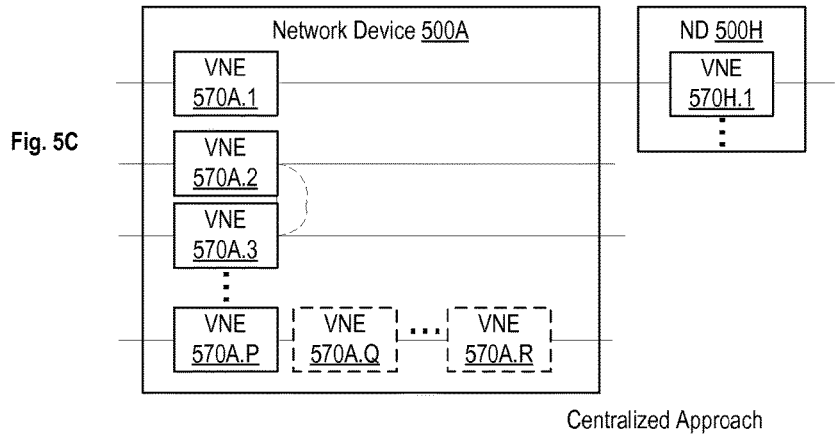
Fig. 5C
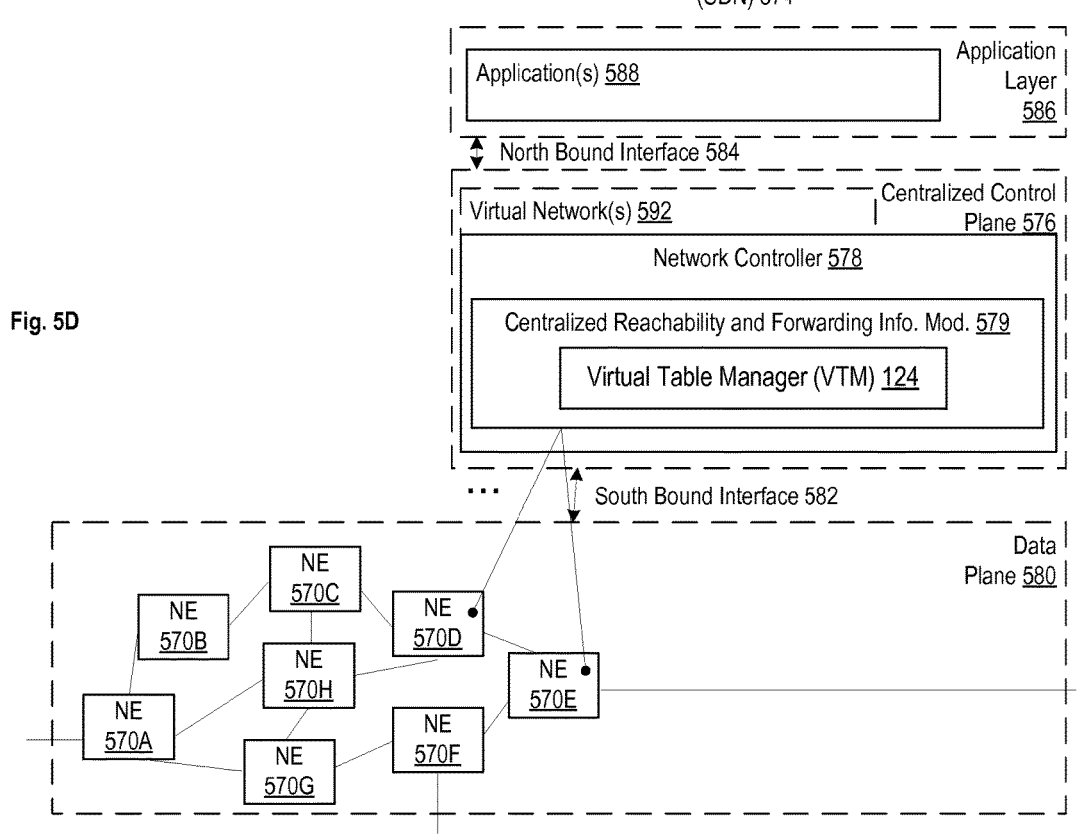
Fig. 5D
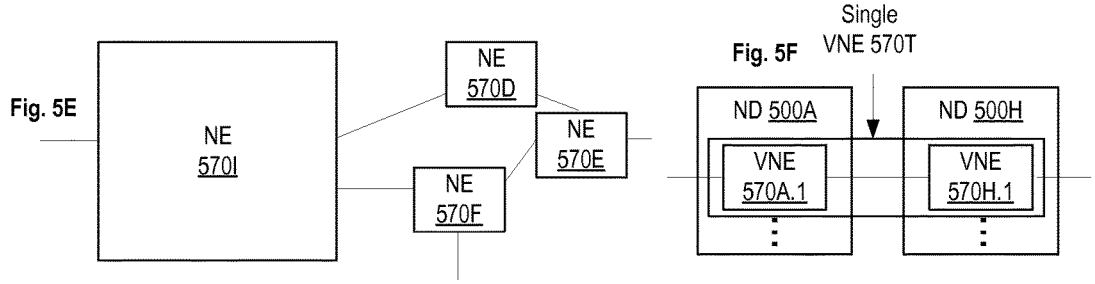
Fig. 5E
Fig. 5F

METHOD AND SYSTEM FOR VIRTUALIZING FLOW TABLES IN A SOFTWARE-DEFINED NETWORKING (SDN) SYSTEM

FIELD OF INVENTION

The embodiments of the invention are related to the field of networking. More specifically, the embodiments of the invention relate to a method and system for virtualizing flow tables in a software-defined networking (SDN) system.

BACKGROUND

Software-Defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

For implementing SDN, the Open Networking Foundation (ONF), an industrial consortium focusing on commercializing SDN and its underlying technologies, has defined a set of open commands, functions, and protocols. The defined protocol suites are known as the OpenFlow (OF) protocol. In the OpenFlow protocol, packets of traffic flows are forwarded through one or more flow tables in an OpenFlow switch. When there are a plurality of flow tables in an OpenFlow switch, the flow tables are sequentially numbered, starting at 0. The packets are processed through an Openflow flow table pipeline, starting at flow table 0. The processed packets at a higher numbered flow table cannot be looped back to be processed again by the same flow table or a lower numbered flow table. In addition, each flow table contains its own key composition for lookup, and the key compositions are configured a priori by a SDN controller.

SUMMARY

A method for virtualizing flow tables in a software-defined networking (SDN) system is disclosed. The method is implemented in a network element coupled to the SDN system, which contains a set of network elements processing traffic flows and a SDN controller managing the set of network elements. The method includes creating a set of virtual tables for processing packets of traffic flows at the network element based on a set of flow tables of the network element, where the set of flow tables is ordered in a sequence. The method further includes mapping each of the set of virtual tables to a single flow table of the set of flow tables, where the mapping causes at least one flow table being mapped to a plurality of the set of virtual tables. The method also includes forwarding packets of traffic flows to the set of virtual tables for processing.

A network element configured to virtualize flow tables in a software-defined networking (SDN) system is disclosed. The network element is coupled to software-defined networking (SDN) system, which contains a set of network elements processing traffic flows and a SDN controller managing the set of network elements. The network element creates a set of virtual tables for processing packets of traffic flows at the network element based on a set of flow tables of the network element, where the set of flow tables is ordered in a sequence; map each of the set of virtual tables to a single flow table of the set of flow tables, where the mapping causes at least one flow table being mapped to a plurality of the set of virtual tables; and forward packets of traffic flows to the set of virtual tables for processing.

A non-transitory machine-readable medium for virtualizing flow tables in a software-defined networking (SDN) system is disclosed. When executed by a processor, the non-transitory machine-readable medium causes the processor to perform operations in a network element coupled to a software-defined networking (SDN) system, which contains a set of network elements processing traffic flows and a SDN controller managing the set of network elements. The operations include creating a set of virtual tables for processing packets of traffic flows at the network element based on a set of flow tables of the network element, where the set of flow tables is ordered in a sequence. The operations further include mapping each of the set of virtual tables to a single flow table of the set of flow tables, where the mapping causes at least one flow table being mapped to a plurality of the set of virtual tables. The operations also include forwarding packets of traffic flows to the set of virtual tables for processing.

Embodiments of the invention aim at improving the efficiency of table lookup for packet forwarding. Through the mapping of flow tables to virtual tables, the packet processing is more flexible and it saves storage space as it avoids the need of storing fields such match fields of the flow tables multiple times.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 5A illustrates connectivity between network devices (NDs) within an exemplary network, as well as three exemplary implementations of the NDs, according to some embodiments of the invention.

FIG. 5B illustrates an exemplary way to implement the special-purpose network device 502 according to some embodiments of the invention.

FIG. 5C illustrates various exemplary ways in which virtual network elements (VNEs) may be coupled according to some embodiments of the invention.

FIG. 5D illustrates a network with a single network element (NE) on each of the NDs of FIG. 5A, and a centralized approach for maintaining reachability and forwarding information (also called network control), according to some embodiments of the invention.

FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention.

DETAILED DESCRIPTION

Figure 1A:
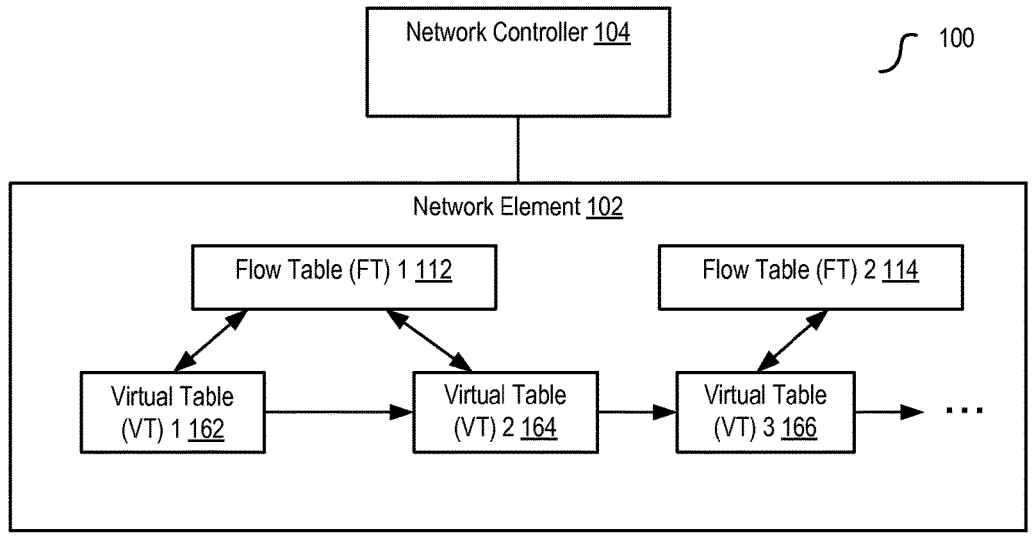
FIG. 1A illustrates an architecture of virtualizing SDN flow tables according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Scalability Issue of Forwarding Packets Through Flow Tables

According to the OpenFlow protocol, packets of traffic flow are processed through a set of ordered flow tables. The ordering of flow tables presents challenges in implementing some traditional applications in a SDN system complying with the OpenFlow protocol.

For example, in an Open Systems Interconnection (OSI) layer 2 (L2) application, the source media access control (MAC) learning and destination MAC lookup for forwarding may be done on the same table called MAC table or Bridge table according to the IEEE 802.1q transparent bridging protocol. The table is used differently for the source MAC learning and destination MAC lookup:

The key for the source MAC learning is the L2 domain identifier (ID) and source MAC address of the L2 packet (i.e., an Ethernet frame). If there is a match in the table (referred to as a "hit"), nothing needs to be done; and if there is a lookup miss (no matching entry in the table), the network element receiving the L2 packet tries to learn the MAC address.

The key for the destination MAC lookup is the L2 domain ID and destination MAC address of the L2 packet. If there is a match in the table, the packet is forwarded per returned exit vector; and if there is a lookup miss, the packet is sent to a flood list to broadcast to all member of ports of the L2 domain.

Thus, for the transparent bridging application, the same table is used for the source MAC learning and destination MAC lookup for forwarding, and MAC aging is done on the same table. However, the keys for the two operations are different, and the lookup miss operations are different too. Note since a key may contain a set of one or more components, the term "key component" is used to denote the component, a key component may be for an exact match to the match field(s) of the table, or only for wildcard, or a mixed of exact/wildcard match.

If the same transparent bridging operations are implemented according to the OpenFlow model, a possible implementation follows. Since the keys and operations following the lookup are different, two tables are needed. Additionally, since the tables are sequentially numbered, assume the two tables are Table X and Table Y, where X and Y are table identifiers (IDs), and X<Y. The operations in the two tables are the following:

The source MAC learning table, Table X:
  The key is the L2 domain ID and source MAC address;
  If there is a hit—the packet may be forwarded to Table Y (e.g., using a goto-table instruction);
  If it is a miss—the packet is sent to the SDN controller for source MAC learning and also forwarded to Table Y for destination MAC lookup.
The destination MAC lookup table, Table Y:
  The key is the L2 domain ID and destination MAC address;
  If there is a hit, the packet is forwarded on;
  If there is a miss—the packet is sent to the SDN controller for flooding.

The Tables X and Y contain mostly same fields, yet they have to be duplicated as the lookup key components are different. In OpenFlow, each flow table (referred to as an OpenFlow table) has preconfigured key components, which are static in nature, and the SDN controller needs to configure the key components. In addition, the SDN controller needs to configure operations upon hit (through "instructions" field of a flow entry), and operations upon miss (through a table miss entry of the table).

With duplication, the implementation is suboptimal. For example, in the transparent bridging operations of an enterprise/core network setting, there often needs to be millions of table entries for each of the source MAC learning table and destination MAC lookup table. The duplication causes significant more storage overhead and uses much more processing resources in the network element (OpenFlow switch is one type of network element). When the table lookup is achieved through a costly search engine such as a ternary content-addressable memory (TCAM) or longest prefix match (LPM) search engine, the cost for lookup is drastically increased. In addition, despite the known duplication, the SDN controller needs to interact with both tables, and that causes more processing resources at the SDN controller too. Furthermore, with the two tables contain many same entities, the synchronization between the tables presents a challenge to make the table consistent and correct. Thus, the implementation of L2 transparent bridging through the standard OpenFlow protocol may not scale well.

Not only L2 applications may encounter scalability issues in implementing within the OpenFlow protocol, L3 applications may encounter similar issues. For example, for L3 reverse path forwarding (RPF) filtering, the source IP address in L3 forwarding information base (FIB) needs to be looked up. Since the key components for lookup and the table miss handling likely are different, the source IP based RPF filtering and destination IP based packet forwarding use different flow tables, thus the FIB needs to be duplicated, which incurs the additional cost similar to the L2 transparent bridging application.

While the two examples are given for implementing applications through the standard OpenFlow protocol, other applications may encounter similar issue with the duplication of flow tables and it is desirable to remove the duplication in implementing applications in a SDN system.

Architectures for Virtualizing Flow Tables

FIG. 1A illustrates an architecture of virtualizing SDN flow tables according to one embodiment of the invention. System 100 is a SDN system containing a network controller 104 (also referred interchangeably to as a SDN controller in this specification). The network controller 104 manages a set of network elements, including a network element 102. The detailed operations of a network controller and network elements are discussed herein below in relation to FIGS. 5A-F.

Flow tables store forwarding information to direct forwarding of incoming packets by a network element. Flow tables are ordered in a sequence that forms the processing pipeline for the incoming packets. The flow tables are numbered with flow table IDs, and each flow table ID is a unique numeric integer number. The flow tables are ordered according to the flow table IDs, and a flow table with a smaller flow table ID is always at the front of a flow table with a bigger flow table ID in the processing pipeline. Thus, flow table 1 at reference 112 has a smaller flow table ID than that of flow table 2 at reference 114.

For a SDN system without implementing embodiments of the invention, the network controller 104 configures the flow tables such as flow tables 1 and 2, including match fields, key components for lookup, table miss handling, and statistics collection. When a packet is received and forwarded to a particular flow table such as flow table 1, the network element 102 searches for a matching entry in the flow table 1, and if the matching entry is found, the statistics is updated (e.g., through a counter), and the packet is processed through instructions corresponding to the matching entry, and metadata associated with the packet (e.g., the output port, quality of service (Qos) indication) is also updated. If no matching entry is found, the packet is processed through a table miss handle entry.

According to one embodiment of the invention, a set of virtual tables are created in the network element 102. The virtual tables are mapped to the flow tables, and at least one flow table is mapped to a plurality of virtual tables. As illustrated, virtual tables 1 and 2 at references 162 and 164 respectively map to flow table 1 at reference 112. Virtual table 3 at reference 166 maps to flow table 2 at reference 114. Instead of forwarding packets based on flow tables, network element 102 forwarding packets based on virtual tables referring to the mapping flow tables.

In one embodiment, the flow tables keep match fields, which are shared by the virtual table(s) mapped to the flow tables, and the virtual tables keep their respective key components, so that they may use their key components to do table lookup in the flow tables. Since match fields remain in the flow tables, the storage related to match fields are not duplicated, thus the virtualization results in saving versus the standard OpenFlow model.

Figure 1B:
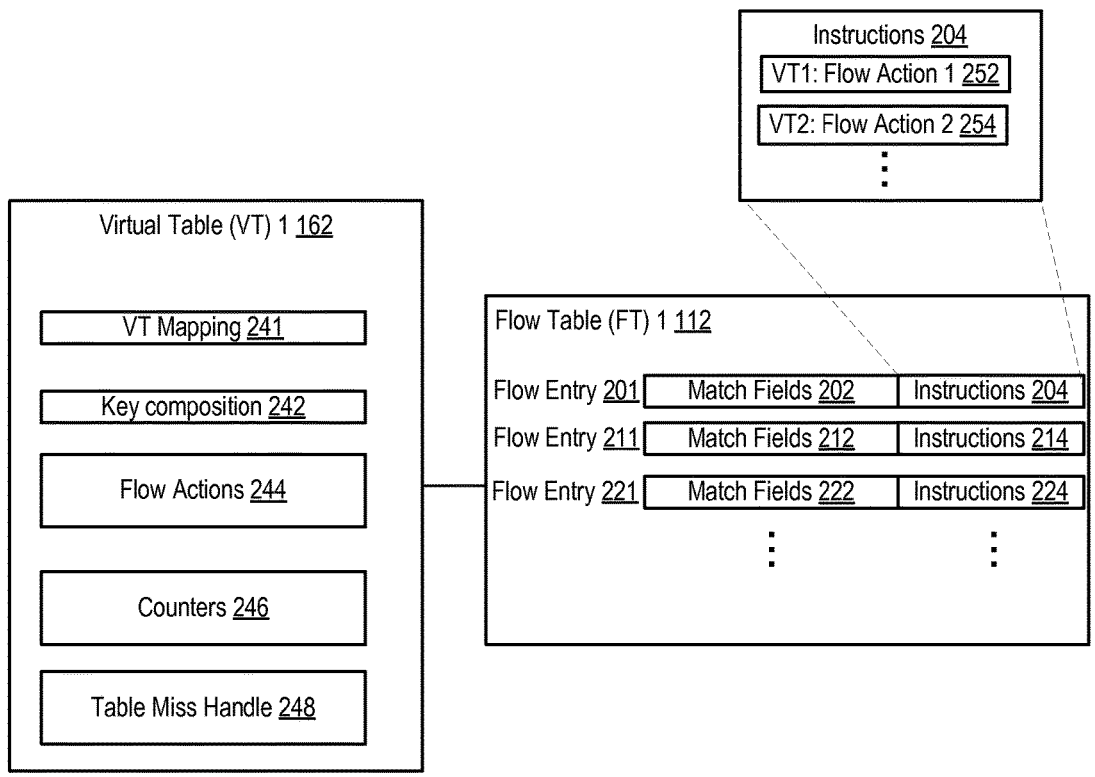
FIG. 1B illustrates separation of the virtual table and flow table according to one embodiment of the invention.

FIG. 1B illustrates separation of the virtual table and flow table according to one embodiment of the invention. Virtual table 1 at reference 162 maps to flow table 1 at reference 112. Flow table 1 contains a number of flow entries such as flow entries 201-221. Each flow entry in flow table 1 contains match fields and instructions field.

In one embodiment, the match fields in flow table 1 are same or similar to the match fields as defined in the OpenFlow protocol. They are to be matched against packets, and contain ingress ports, packet headers, other pipeline fields such as metadata specified by a previous flow table. Flow table 1 may include a priority field (not shown) in each flow entry, where the priority field is for matching precedence of the flow entry in one embodiment. Match fields (and optionally the additional priority field) are used for the network element to match a packet against a flow entry. The matching is typically through a key that contains a set of key components.

Flow table 1 also contain instructions fields that modify the action set or pipeline processing. While according to the OpenFlow protocol, the instructions fields detail the action set to be taken to a packet matching a particular flow entry, the zoom-in instructions 204 illustrates that at least some instructions fields are different from the OpenFlow protocol standard. In instructions 204, each instruction contains flow action(s) to be taken for a particular virtual table through a tuple including a virtual table ID and flow action entity. In other words, the flow action(s) taken to a packet is based on not only the matching flow entry in the flow table, but also the virtual table mapped to the flow table. In one embodiment, not all the instructions contain reference to virtual tables. For example, when a flow table is mapped to only a single virtual table, the reference to a virtual table is not necessary.

The flow actions(s) to be taken for the particular virtual table are one of the action sets as defined in the OpenFlow protocol in one embodiment, including pop, push, quality of service actions, and going to another flow table (Goto-Table).

Virtual table 1 includes virtual table mapping block 241, which indicates which flow table the virtual table is mapped to. A virtual table is mapped to a single flow table, and the virtual table mapping may include a flow table ID indicating that the virtual table is mapped to the flow table. In an alternative embodiment, the virtual table mapping is stored in network controller 104, which maps the virtual table ID to the flow table ID.

Virtual table 1 also includes a key composition block 242, which is the key containing the set of key compositions used to look up the match fields of the corresponding flow table. Virtual table 1 includes a flow actions block 244, which contains a set of flow actions that may be performed to a packet matching a flow entry of the corresponding flow table. Virtual table 1 includes a counters block 246, which updates for matching packets. While the counters are maintained for each flow table, flow entry, port, queue, group, and etc. according to the OpenFlow protocol, virtual tables maintain the counters (e.g., based on the flow actions at reference 244) in one embodiment of the invention. In addition, virtual table 1 includes a table miss handle 248 that specifies how to process packets unmatched by flow entries in the corresponding flow table. Since one virtual table maps to a single flow table, there is no ambiguity as of how the virtual tables are created and maintained.

In one embodiment, the virtual table mapping block 241, the key composition block 242, the flow actions block 244, and table miss handle block 248 are configured based on a request from the SDN controller. The counters blocks 246 are updated as packets processed through the processing pipeline.

Note that not every flow table is mapped to a virtual table in one embodiment. For example, in some embodiment, some flow tables in the processing pipeline may be implemented without a significant amount of duplication in table content, in that case, those flow tables may not be mapped to any virtual table, and they are implemented in a structure known in the art, e.g, following the OpenFlow protocol.

The addition of virtual tables in the packet processing pipeline of a network element is advantageous in that match fields is kept in the flow table while the operations to the packets matching the flow entry is performed according to the mapping virtual table. The match fields can be long and take significant storage space. For example, according to the OpenFlow specification 1.3.0, the OpenFlow Extensible Match (OXM) format, each match field can be 259 bytes long. When performing operations for applications such as L2 transparent bridging or L3 RPF filtering, the match fields are the same for multiple operations. Not duplicating the match fields results in significant saving in storage and processing resources when there are millions of such match fields in the applications such as L2 transparent bridging and L3 RPF filtering. With virtual tables being used to perform flow actions and multiple virtual tables being mapped to a single flow table, the key components and table missing handles can still be predetermined by a network controller, and the network controller can determine the respective key components and table missing handles in the multiple virtual tables. Thus, the operations in the network controller require little or no modification for the virtualization of flow tables.

Operations with Virtualized Flow Tables

Figure 2:
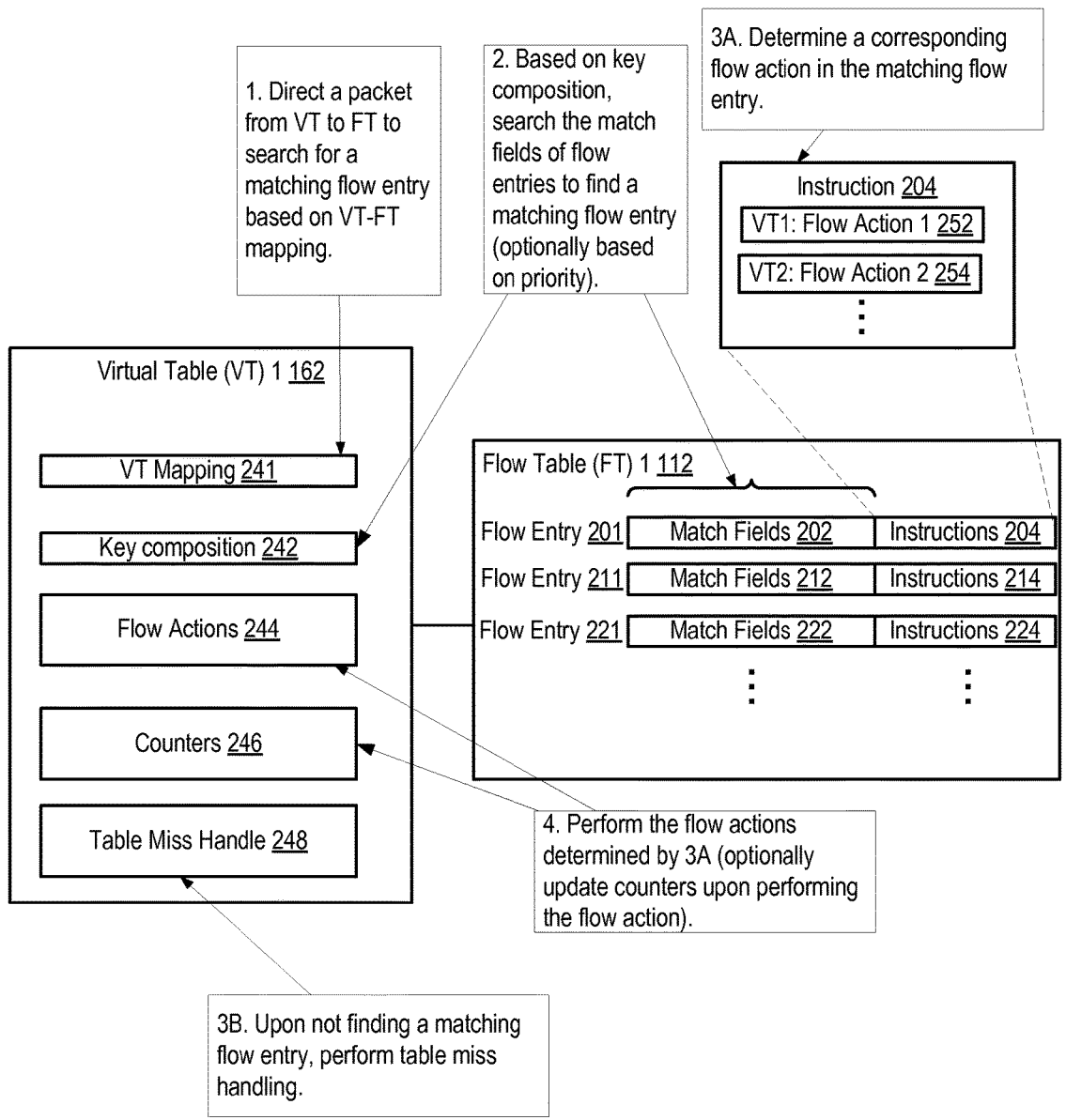
FIG. 2 illustrates operations with virtualized flow tables according to one embodiment of the invention.

FIG. 2 illustrates operations with virtualized flow tables according to one embodiment of the invention. Virtual table 1 and flow table 1 are the same as the ones of FIG. 1B, and the same or similar references indicate elements or components having the same or similar functionalities. Task boxes 1 to 4 illustrate the order in which operations are performed according to one embodiment of the invention.

In one embodiment, packets are forwarded to the packet processing pipeline include both virtual tables and flow tables. The packets are first forwarded to a virtual table and they are then processed with reference to the corresponding flow table. After the process, the packets are either forwarded to the next virtual table for further processing or to the network controller when the network element requires further input.

At task box 1, a packet is received at virtual table 1, and the network element directs the packet from the virtual table to its mapping flow table to search for a matching flow entry. The mapping is based on a predetermined mapping between the virtual table and the flow table. At task box 2, the network element searches the match fields of flow entries to find a matching flow entry. The searching is based on the key composition in virtual table 1. There may be multiple matching flow entries for a packet, in which case the flow entry with the higher priority is selected as the matching flow entry.

Upon finding a matching flow entry, at task box 3A, the network element determines a corresponding flow action in the matching flow entry. There may be multiple set of flow actions, each set for a particular virtual table mapped to the flow table. Based on the virtual table that a packet being referred from (in this case virtual table 1), the set of flow actions for the virtual table is selected. In alternative, upon not finding a matching flow entry, at task box 3B, the network element performs operations according to table miss handle 248.

At task box 4, the network element performs the set of flow actions according to the selected flow actions selected at task box 3A. In addition, the counters may be updated based on the performance of the set of flow actions or the table miss handle.

Note that the packet processing pipeline according to the embodiments of the invention is different from the packet processing pipeline according to the existing OpenFlow such as the OpenFlow Switch Specification Version 1.3.4 published on Mar. 27, 2014. The difference is mainly on the network element (referred to as the OpenFlow switch) side. In order to make the network element work according to the embodiments of the invention, one or more ways may identify the network element with flow table virtualization capability:

The network element may negotiate with the SDN controller and indicate its virtualization capability.

A vendor extension may be added in communications between the network element and the SDN controller so that the SDN controller may recognize the vendor extension and know the network element's virtualization capability.

A predetermined data path identifier is assigned for the network element with flow table virtualization capability.

The network element may initiate communication through a predetermined port to the SDN controller.

Once the table virtualization capability is identified by the SDN controller, the SDN controller may act accordingly, e.g., setting up mapping flow tables and virtual table and configures various fields and blocks in the flow tables and virtual tables.

Flow Diagrams for Implementing Flow Table Virtualization

Figure 3:
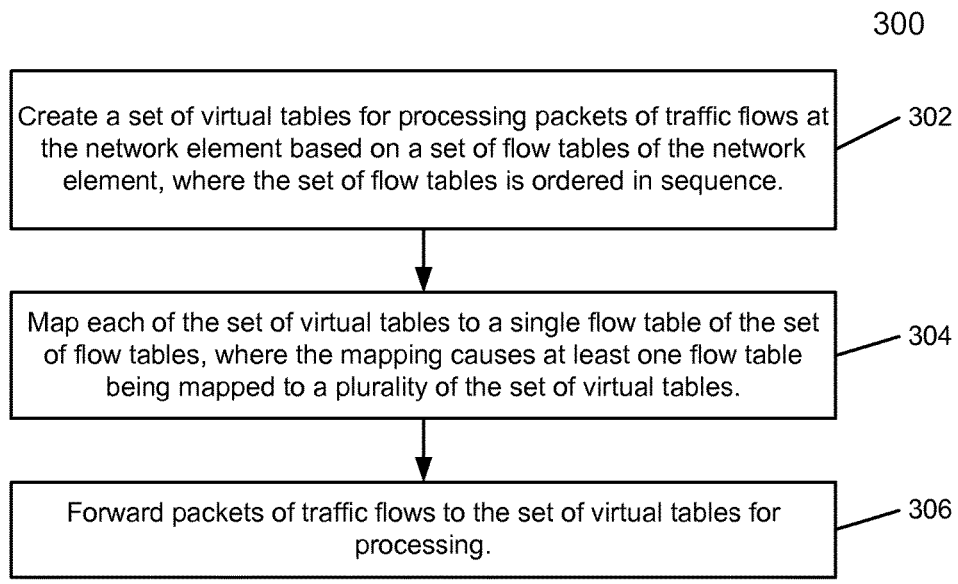
FIG. 3 is a flow diagram illustrating implementation of flow table virtualization according to one embodiment of the invention.

FIG. 3 is a flow diagram illustrating implementation of flow table virtualization according to one embodiment of the invention. Method 300 may be implemented in network element 102 of FIG. 1A according to one embodiment of the invention.

At reference 302, a set of virtual tables is created for processing packets of traffic flows. The creation is based on the set of flow tables of the network element. When the flow tables are created based on the OpenFlow protocol, the flow tables are ordered in sequence. The creation of the set of virtual tables may be in response to a request from a SDN controller managing the network element, and it may also be triggered by an operator of the SDN system that the network element is a part of.

In one embodiment, creating each virtual table includes performing at least one of: setting a table identifier for the virtual table, setting a set of key components of the virtual table, setting a set of actions upon receiving a matching packet, and setting an entry for matching miss.

At reference 304, each of the set of virtual tables is mapped to a single flow table of the set of flow tables, where the mapping causes at least one flow table being mapped to a plurality of the set of virtual tables. In one embodiment, the mapping each of the set of virtual tables comprises mapping a table identifier of a virtual table to a table identifier of a flow table. The mapping may be based on a request from the SDN controller, and it may also be based on characteristics of the network element.

At reference 306, packets of traffic flows are forwarded to the set of virtual tables for processing. The set of virtual tables process the packets in coordination with the mapping flow tables. The set of virtual tables forms a processing pipeline of the network element, and the ordered flow tables are referred to in processing the packets.

Figure 4:
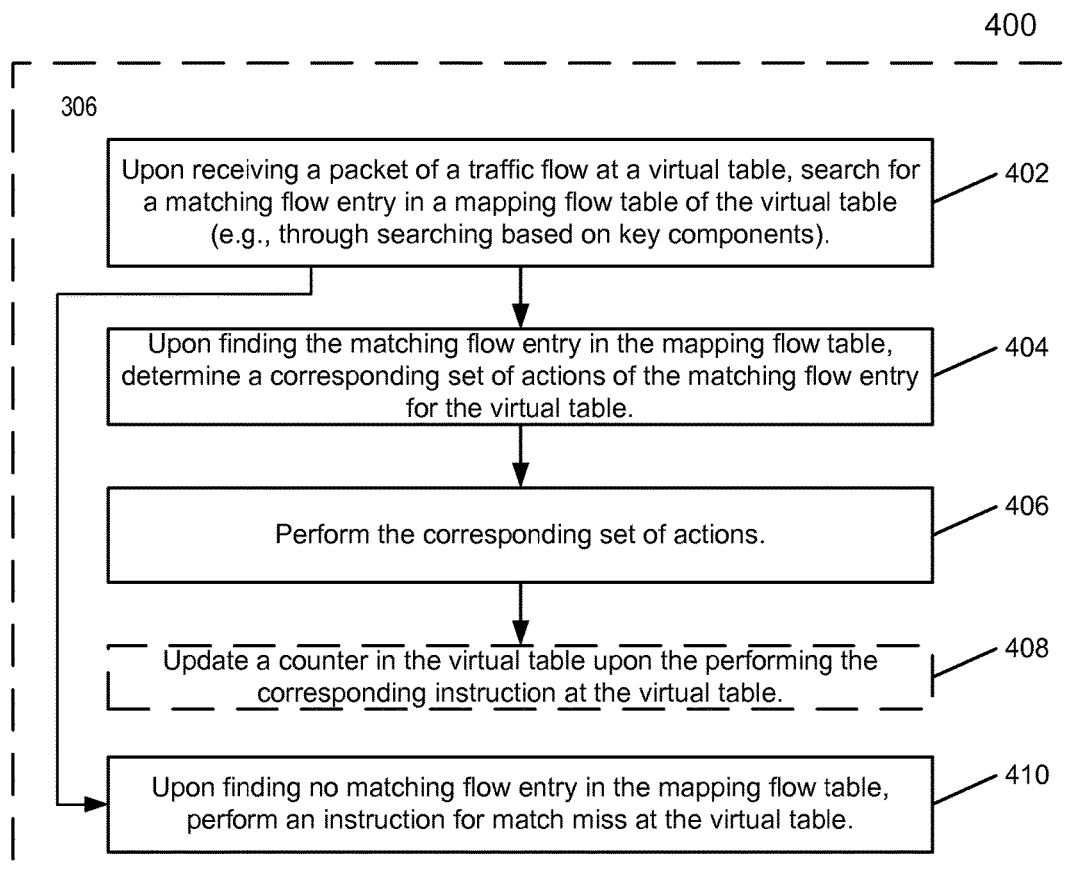
FIG. 4 is a flow diagram illustrating the operations of processing the packets according to one embodiment of the invention.

FIG. 4 is a flow diagram illustrating the operations of processing the packets according to one embodiment of the invention. Method 400 may be implemented in network element 102 of FIG. 1A according to one embodiment of the invention. In one embodiment, method 400 is an implementation of reference 306.

At reference 402, upon receiving a packet of a traffic flow at a virtual table, searching for a matching flow entry is performed in the mapping flow table of the virtual table. In one embodiment, the searching is performed through matching key components of the packet to match fields of flow entries in its mapping flow table. The key components are defined for the virtual table, and values of corresponding fields in the packet are used for matching. For example, in L2 transparent bridging operation, the key components may be the L2 domain ID and source MAC address, and these key components are the values of the L2 domain ID and source MAC address fields in the header of the packet, and the key components in the packet are referred to for the matching.

At reference 404, upon finding the matching flow entry in the mapping flow table, a corresponding set of actions of the matching flow entry for the virtual table is determined. The corresponding set of actions may be one of the set of actions defined in the OpenFlow protocol in one embodiment. At reference 406, the corresponding set of actions are performed. Upon performing the corresponding set of actions, one or more counters in the virtual table is updated at reference 408.

In alternative, upon finding no matching flow entry in the mapping flow table, an instruction for match miss at the virtual table is performed at reference 410.

Upon finishing the processing of the packet, the packet may be sent to the next virtual table or the SDN controller for further processing. Note the packet may be updated with revised or new metadata and changed packet content. The packet update through the processing of the virtual table may comply with the OpenFlow protocol according to one embodiment of the invention.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software, such as a virtual table coordinator (VTC) 555. The virtual table coordinator coordinates flow table virtualization as discussed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, VTC 555 may be executed by the networking hardware 510 to instantiate a VTC instance (VI) 521, which performs methods as discussed herein above in relation to FIGS. 1-4. VI 521 and that part of the networking hardware 510 that executes that instance (be it hardware dedicated to that networking software instance and/or time slices of hardware temporally shared by that networking software instance with others of the VTC instance 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). Note that the forwarding tables 534A-R contains both flow tables and virtual table, and the flow table be structured differently from the flow tables known in the art. As illustrated in FIGS. 1B and 2, some fields and entries of the flow tables may be allocated in the corresponding virtual tables.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, The general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein VTC 557. During operation, the processor(s) 542 execute the VTC 557 to instantiate a hypervisor 554 (sometimes referred to as a virtual machine monitor (VMM)) and one or more virtual machines 562A-R that are run by the hypervisor 554, which are collectively referred to as software instance(s) 552. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 562A-R, and that part of the hardware 540 that executes that virtual machine (be it hardware dedicated to that virtual machine and/or time slices of hardware temporally shared by that virtual machine with others of the virtual machine(s) 562A-R), forms a separate virtual network element(s) 560A-R.

The virtual network element(s) 560A-R perform similar functionality to the virtual network element(s) 530A-R. For instance, the hypervisor 554 may present a virtual operating platform that appears like networking hardware 510 to virtual machine 562A, and the virtual machine 562A may be used to implement functionality similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 562A-R differently. For example, while embodiments of the invention are illustrated with each virtual machine 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 554 includes a virtual switch that provides similar forwarding services as a physical Ethernet switch. Specifically, this virtual switch forwards traffic between virtual machines and the NIC(s)

544, as well as optionally between the virtual machines 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the virtual machines 562A-R may operate as servers; the same would be true for the hybrid network device 506; in the case of the special-purpose network device 502, one or more such servers could also be run on a hypervisor executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 5D illustrates a network with a single network element on each of the NDs of FIG. 5A. Specifically, FIG. 5D illustrates network elements (NEs) 570A-H with the same connectivity as the NDs 500A-H of FIG. 5A with a centralized approach for maintaining reachability and forwarding information (also called network control), according to some embodiments of the invention.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). The centralized reachability and forwarding information module 579 contains a virtual table manager (VTM) 124. VTM 124 coordinates with network elements to perform flow table virtualization. For example, VTM 124 may send a request to a network element to ask the network element to create a set of virtual tables. VTM 124 may store the mapping between the flow tables and the virtual tables.

The network intelligence is centralized in the centralized control plane 576 executing on electronic devices that are typically separate from the NDs. For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagrams FIGS. 3-4 are described with reference to the exemplary embodiment of FIGS. 1, 2 and 5. However, it should be understood that the operations of flow diagrams can be performed by embodiments of the invention other than those discussed with reference to the exemplary embodiment of FIGS. 1, 2 and 5, and the exemplary embodiment of FIGS. 1, 2 and 5can perform operations different than those discussed with reference to the flow diagrams of FIGS. 3-4.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network element coupled to a software-defined networking (SDN) system, wherein the SDN system contains a set of network elements processing traffic flows and a SDN controller managing the set of network elements, the method comprising:
   creating a set of virtual tables for processing packets of traffic flows at the network element based on a set of flow tables of the network element, wherein the set of flow tables is ordered in a sequence;
   mapping each of the set of virtual tables to a single flow table of the set of flow tables separated from the set of virtual tables, wherein the mapping causes at least one flow table being mapped to a plurality of virtual tables in the set of virtual tables, wherein the at least one flow table includes match fields shared by the plurality of virtual tables, and wherein at least one of the plurality of virtual tables includes an entry for match miss; and
   forwarding packets of traffic flows to the set of virtual tables for processing.

2. The method of claim 1, wherein the creating the set of virtual tables comprises:
   for each virtual table, performing at least one of:
   setting a table identifier for the virtual table;
   setting a set of actions upon receiving a matching packet; and
   setting an entry for match miss.

3. The method of claim 1, wherein the mapping each of the set of virtual tables to a flow table of the network element comprises:
   mapping a table identifier of a virtual table to a table identifier of a flow table.

4. The method of claim 1, wherein the forwarding packets of traffic flows comprises:
   upon receiving a packet of a traffic flow at a virtual table, searching for a matching flow entry in a mapping flow table of the virtual table;
   upon finding the matching flow entry in the mapping flow table, determining a corresponding set of actions of the matching flow entry for the virtual table; and
   performing the corresponding set of actions.

5. The method of claim 4, wherein the searching for the matching flow entry is to match key components of the packet to the match fields in the mapping flow table.

6. The method of claim 4, further comprising:
   upon finding no matching flow entry in the mapping flow table, performing an instruction for match miss.

7. The method of claim 4, further comprising:
   updating a counter in the virtual table upon the performing the corresponding set of actions.

8. The method of claim 1, further comprising:
   identifying the network element with flow table virtualization capability through at least one of:
   capability negotiation between the network element and the SDN controller;
   adding a vendor extension in communication between the network element and the SDN controller;
   adding a predetermined data path identifier for the network element with flow table virtualization capability; and
   initiating communication from the network element through a predetermined port to the SDN controller.

9. A network element coupled to a software-defined networking (SDN) system, wherein the SDN system contains a plurality of network elements processing traffic flows and a SDN controller managing the plurality of network elements, the network element comprising:
   a processor and a non-transitory machine-readable storage medium coupled to the processor, the non-transitory machine-readable storage medium containing an virtual table coordinator module executable by the processor, wherein the network element is operative to:
   create a set of virtual tables for processing packets of traffic flows at the network element based on a set of flow tables of the network element, wherein the set of flow tables is ordered in a sequence,
   map each of the set of virtual tables to a single flow table of the set of flow tables separated from the set of virtual tables, wherein the mapping causes at least one flow table being mapped to a plurality of virtual tables including at least two virtual tables in the set of virtual tables, wherein the at least one flow table includes match fields shared by the plurality of virtual tables, and wherein at least one of the plurality of virtual tables includes an entry for match miss, and forward packets of traffic flows to the set of virtual tables for processing.

10. The network element of claim 9, wherein the creation of the set of virtual tables is to:

for each virtual table, perform at least one of:
   setting a table identifier for the virtual table;
   setting a set of instructions upon receiving a matching packet; and
   setting an entry for match miss.

11. The network element of claim 9, wherein the mapping is to:

map a table identifier of a virtual table to a table identifier of a flow table.

12. The network element of claim 9, wherein the forwarding is to:

upon receiving a packet of a traffic flow at a virtual table, search for a matching flow entry in a mapping flow table of the virtual table;

upon finding the matching flow entry in the mapping flow table, determine a corresponding set of actions of the matching flow entry for the virtual table; and perform the corresponding set of actions.

13. A non-transitory machine-readable medium having instructions stored therein, which when executed by a processor, cause the processor to perform operations in a network element coupled to a software-defined networking (SDN) system, wherein the SDN system contains a set of network elements processing traffic flows and a SDN controller managing the set of network elements, the operations comprising:

creating a set of virtual tables for processing packets of traffic flows at the network element based on a set of flow tables of the network element, wherein the set of flow tables is ordered in a sequence;

mapping each of the set of virtual tables to a single flow table of the set of flow tables separated from the set of virtual tables, wherein the mapping causes at least one flow table being mapped to a plurality of virtual tables including at least two virtual tables in the set of virtual tables, wherein the at least one flow table includes match fields shared by the plurality of virtual tables, and wherein at least one of the plurality of virtual tables includes an entry for match miss; and forwarding packets of traffic flows to the set of virtual tables for processing.

14. The non-transitory machine-readable medium of claim 13, wherein the creating the set of virtual tables comprises:

for each virtual table, performing at least one of:
   setting a table identifier for the virtual table;
   setting a set of actions upon receiving a matching packet; and
   setting an entry for match miss.

15. The non-transitory machine-readable medium of claim 13, wherein the mapping each of the set of virtual tables to a flow table of the network element comprises:

mapping a table identifier of a virtual table to a table identifier of a flow table.

16. The non-transitory machine-readable medium of claim 13, wherein the forwarding packets of traffic flows comprises:

upon receiving a packet of a traffic flow at a virtual table, searching for a matching flow entry in a mapping flow table of the virtual table;

upon finding the matching flow entry in the mapping flow table, determining a corresponding set of actions of the matching flow entry for the virtual table; and performing the corresponding set of actions.

17. The non-transitory machine-readable medium of claim 16, wherein the searching for the matching flow entry is to match key components of the packet to the match fields in the mapping flow table.

18. The non-transitory machine-readable medium of claim 16, further comprising:

upon finding no matching flow entry in the mapping flow table, performing an instruction for match miss.

19. The non-transitory machine-readable medium of claim 16, further comprising:

updating a counter in the virtual table upon the performing the corresponding set of actions.

20. The non-transitory machine-readable medium of claim 13, further comprising:

identifying the network element with flow table virtualization capability through at least one of:
   capability negotiation between the network element and the SDN controller;
   adding a vendor extension in communication between the network element and the SDN controller;
   adding a predetermined data path identifier for the network element with flow table virtualization capability; and
   initiating communication from the network element through a predetermined port to the SDN controller.

* * * * *